Aug. 8, 1967 NILS-OLOF JOHANNESSON ETAL 3,335,223
ARRANGEMENT FOR AUTOMATIC EQUALIZATION OF THE DISTORTION IN DATA TRANSMISSION CHANNELS
Filed Aug. 23, 1963
3 Sheets-Sheet 1

INVENTORS
NILS-OLOF JOHANNESSON
WALTER HERBERT ERWIN WIDL
BY Kane and Nydick
ATTORNEYS INVENTORS
NILS-OLOF JOHANNESSON
WALTER HERBERT ERWIN WIDL
BY Hane and Nydick
ATTORNEYS Aug. 8, 1967 NILS-OLOF JOHANNESSON ET AL 3,335,223

ARRANGEMENT FOR AUTOMATIC EQUALIZATION OF THE DISTORTION IN DATA TRANSMISSION CHANNELS

Filed Aug. 23, 1963

3 Sheets-Sheet 3

INVENTORS
NILS-OLOF JOHANNESSON
WALTER HERBERT ERWIN WIOL
BY Hane and Nydick
ATTORNEYS

United States Patent Office 3,335,223

Patented Aug. 8, 1967

3,335,223

ARRANGEMENT FOR AUTOMATIC EQUALIZATION OF THE DISTORTION IN DATA TRANSMISSION CHANNELS

Nils-Olof Johannesson, Hagersten, and Walter Herbert Erwin Widl, Bandhagen, Sweden, assignors to Telefonaktiebolaget L M Ericsson, Stockholm, Sweden, a corporation of Sweden Filed Aug. 23, 1963, Ser. No. 304,142
Claims priority, application Sweden, Sept. 7, 1962, 9,683/62
6 Claims. (Cl. 178—69)

ABSTRACT OF THE DISCLOSURE

In a data transmission system a data transmitter is connected via a transmission line to a data receiver. In order to minimize the amplitude and phase distortion of pulses by the transmission line, equalizers are automatically connected into the circuits of the data receiver in response to test pulses initially transmitted thereto by the data transmitter. The test pulses are periodically sampled in the data receiver for deviations in their amplitude from a given amplitude. Whenever a deviation exists, a different one of the equalizers, in a routinized order, is actively connected in the circuits of the data receiver.

The present invention refers to a circuit arrangement for equalizing the attenuation distortion and the propagation time distortion in a data transmission channel.

When data transmission is carried out in a system in which a transmission channel is selected immediately before a connection is set up, an individual equalization of the distortion on the line is necessary before sending a data train if the line quality is not satisfactory because a permanent equalization of each line portion which can be selected for use is not economical.

An object of the invention is to determine, before a data transmission connection is set up, the distortion of the connection by the aid of a test signal and to produce a correction of the distortion before the data sending begins, and to disconnect the line and select another line if a satisfactory correction cannot be carried out.

The arrangement according to the invention is substantially characterized by the fact that it comprises a number of correcting networks which in turn can be connected to the channel, and a distortion measuring means which when receiving a pulse signal through the channel, measures the value of the distortion, and switching means which in dependence on the distortion measured, connect correcting networks one by one to the channel until the desired compensation has been obtained.

Figure 1:
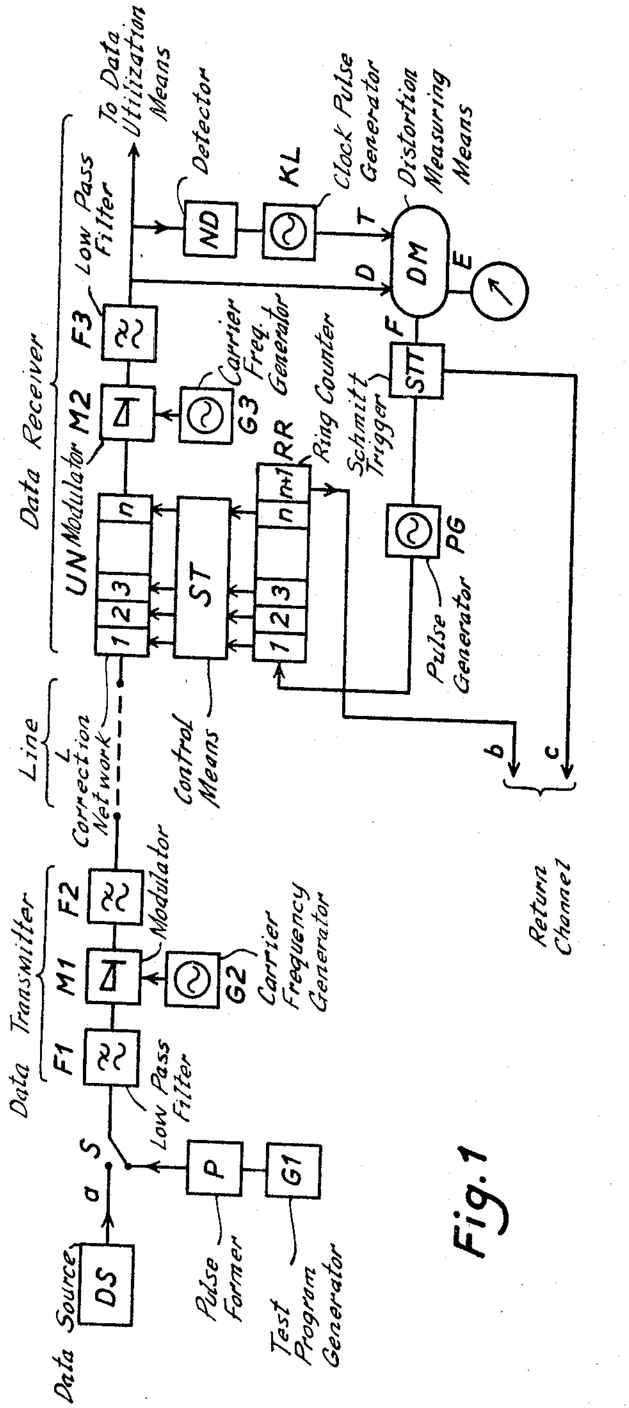
Figure 2:
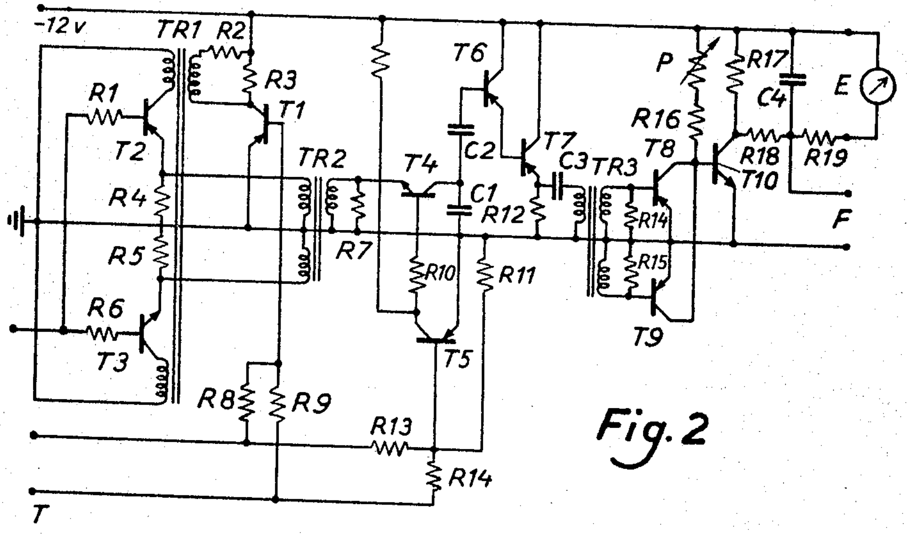
Figure 3:
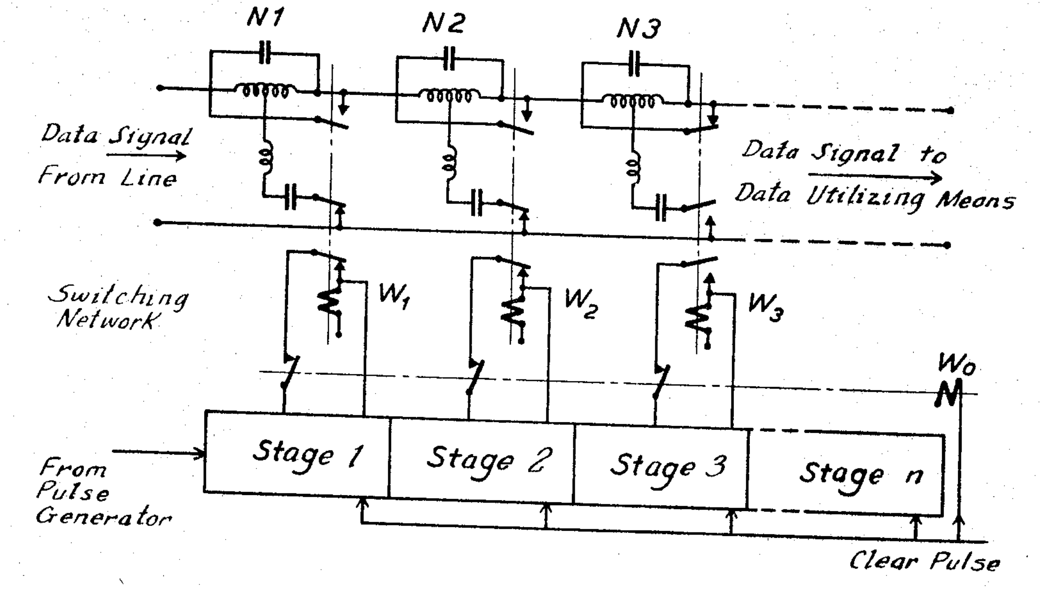
Figures 4, 5, 6, 7, 8, 9, 10, 11:
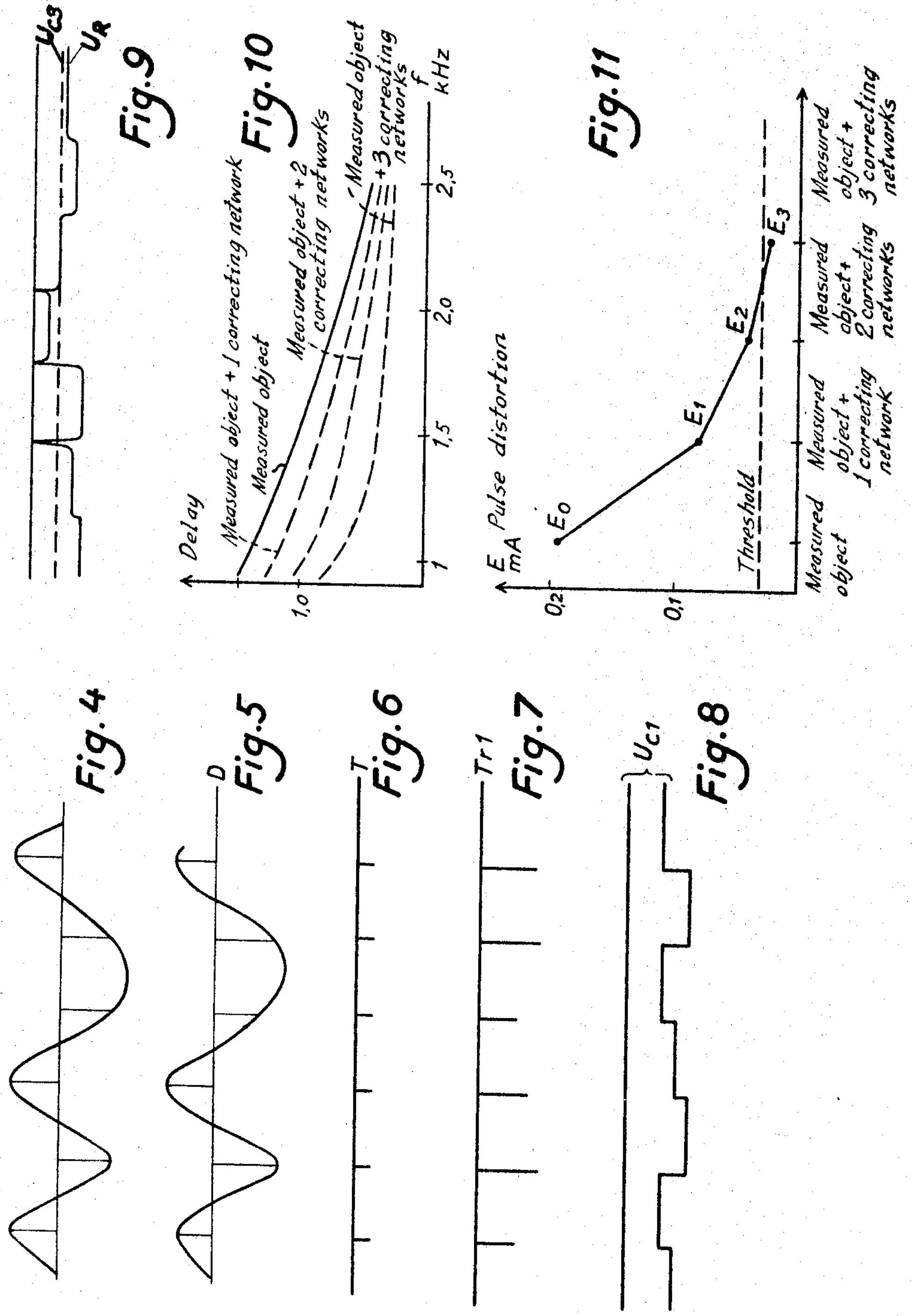

Other objects, features and advantages of the invention will be apparent from the following detailed description when read with the accompanying drawing in which FIG. 1 is a block diagram showing the means necessary for sending and receiving the test signal and for the propagation time correction in the sender and the receiver; FIG. 2 shows a circuit diagram of a distortion measuring means according to the invention; FIG. 3 shows in detail the equalizing network and the control means necessary for its control; FIG. 4 shows diagrammatically the time process of the transmitted test signal; FIG. 5 shows the received test signal; FIG. 6 shows the time signals which are supplied to the distortion measuring means; FIG. 7 shows the amplitude values measured in the received test signal; FIG. 8 shows the integrated value of the amplitude values; FIG. 9 shows the integrated value of the amplitude variations which value should not exceed a certain amount; FIG. 10 shows the curve of the propagation time distortion for a line chosen as an example, before and after the connection of three equalizing networks, and FIG. 11 shows how the distortion is decreased after the connection of one, two or three networks.

FIG. 1 shows in the form of a block diagram the means which are necessary on the sender side for sending the test signal and on the receiver side for receiving the test signal, measuring the propagation time distortion and in dependence on the result of the measuring, connecting to the line a number of equalizing networks, one after the other. By G1 is designated a test program generator generating 1- and 0-signal elements which are symmetrical or random. The test signals are supplied to a pulse former P in which the signal is transformed into direct voltage levels in such a way that for example the signal element 1 is represented by a positive level during the entire bit (binary unit) length and the signal element 0 is represented by a negative level during the entire bit length. The test signals are supplied to a data transmission sender normally used for sending the data signals from a data source DS. The switch S shows symbolically that the data transmission sender can be used alternatively for the sending of data signals and test signals. The data transmission sender comprises in known manner a pulse-shaping low pass filter F1 in which the rectangular pulses are transformed into a $$\frac{\text{Sine } x}{x}$$

function. From this filter the signals are supplied to a modulator M1 where they modulate a carrier wave generated in a carrier frequency generator G2. The modulated carrier wave is then conducted through a second low pass filter F2 in order to eliminate harmonics in the modulation product. The process described above does not differ from what is generally known in data transmission senders. The test signals are conducted through a line L to a mixer circuit M2 on the receiver side where they are mixed with the carrier frequency wave generated in the carrier frequency generator G3. In this way a signal is obtained consisting of the positive and negative half-waves of the carrier frequency. This signal is conducted to a low pass filter F3 for eliminating the harmonics, in consequence of which the signals will obtain the same shape as they had when leaving the filter F1 in the sender. The process described above corresponds exactly to what is customary in data transmission senders and receivers. The signals are supplied through the input D to a distortion measuring means DM which also receives clock pulses through the input T. The clock pulses are generated by a bit frequency generator KL which is synchronized by a detector ND for 0-level crossing. In this way a clock pulse is obtained in the middle of each signal element for controlling the distortion measuring means. The purpose of the distortion measuring means is to determine, as will be explained more fully in connection with FIG. 2 and FIGS. 4–9, whether the variations between the amplitude values in the middle of the signal elements are kept within an allowed limit which is a measure of the amount of the distortion. FIG. 4 shows diagrammatically the transmitted signal after the filter F1 and FIG. 5 shows the received signal after the filter F3. As appears from FIG. 4 the absolute values of the amplitudes of the bit pulses are equal in the subsequent pulse positions of the transmitted signal. On the other hand as a consequence of bit interference certain differences occur between these amplitudes after receipt of the signal as shown in FIG. 5 in correspondence to the propagation time distortion along the line. If the difference between subsequent amplitude values exceeds a previously determined value during a definite time interval, the propagation time distortion is unallowably great.

The distortion measuring means DM gives a signal, the amplitude of which is proportional to the magnitude of the propagation time distortion as will be explained below. This signal is supplied to a Schmitt-trigger STT or a similar circuit which is adjustable in such a way that it gives an output signal when for example the signal from the distortion measuring means exceeds a definite threshold value, but gives no signal when the value is below this amount. The output signal from the Schmitt-trigger STT is supplied to a pulse generator PG which during the time it obtains a signal from the Schmitt-trigger generates pulses at even intervals, for example intervals of one second. The pulses are fed to a ring counter RR that is stepped forward by each pulse and in each step connects an equalizing network UN1, UN2, etc. in series with the line, the attenuation distortion of which is to be detected. When the first equalizing network UN1 has been connected, the distortion is again measured by the distortion measuring means DM and if the distortion still exceeds the permitted value, a signal will still be obtained from the Schmitt-trigger so that the ring counter is stepped forward one step and the equalizing network UN2 is connected. In this way new equalizing networks are connected until the desired value of the propagation time distortion has been obtained. Should this not be obtained after the $n$th step, no further equalizing network will be connected but the $(n+1)$th step in the ring counter gives an information to the sender via the return channel implying that the quality of the line does not permit data sending. If, after connection of a definite number of equalizing networks, the intended line quality has been obtained, it is possible simultaneously to send through an output from the Schmitt-trigger STT which is responsive to the output value from the distortion measuring means DM a signal to the sender via a return channel implying that the switch S can be switched and the normal data sending can begin. It is of course also possible, if it has been found that the line quality after testing of all the $n$-steps has still not the desired value, to reduce the requirements in view of quality and to carry out a new measurement with reduced requirements on quality, the Schmitt-trigger STT being now set to this other value.

FIG. 2 shows a circuit diagram for the distortion measuring means DM according to the invention. The received test signal is supplied to the base of transistor T2 and to the base of transistor T3, in consequence of which, through the emitter-collector circuits of the transistors, there will pass a current which is proportional to the amplitude of the signal. Current can however only pass at the moment determined by the clock pulses which are fed to the distortion measuring means through the input T. These clock pulses are supplied to the base of the transistor T1 so that the transistor T1 becomes conducting during each clock pulse. Owing to the fact that the clock pulses appear simultaneously with the amplitude value which is to be detected, a voltage proportional to this amplitude is supplied to the primary windings of the transformer TR2 simultaneously with each clock pulse. The transistor T5 is also opened in step with the clock pulses. The transistor T4, the collector of which is connected to the capacitor C1 and which becomes conducting in step with the transistor T5, conducts the voltage values from the transformer TR2 to the capacitor C1, so that the latter is charged to the amplitude values of the signal in step with the clock pulses. The voltage variations of the capacitor C1 are supplied through transistors T6, T7 to the transformer TR3 which supplies the voltage variations to a rectifying circuit comprising the transistors T8 and T9. Across the resistance R17 will appear the value of the voltage variations and across the capacitor C4 will appear the integrated value of the amplitude variations. This value is then supplied through the output F to the Schmitt-trigger which in dependence on this value and on its adjustment on its output will produce an output signal for the pulse generator. FIG. 8 shows an example of the variation of the voltage across the capacitor C1 and FIG. 9 shows an example for the voltage changes $U_R$ and the average value of these changes $U_{C3}$. As mentioned earlier, FIG. 4 shows the time process of the transmitted test signal, FIG. 5 the time process of the received signal, FIG. 6 shows the clock pulses and FIG. 7 shows the amplitude values of the respective signal elements measured in the received test signal. FIG. 3 shows an embodiment of the equalizing network and the control means of the equalizing network. The equalizing networks N1, N2, etc., consist of bridged T-links which normally are disconnected through the break contacts of the relays W1, W2. When the first step of the ring counter is connected, the relay W1 operates and connects the equalizing network N1 in series with the line. The next pulse to the ring counter connects the equalizing network N2. FIG. 3 shows the condition in which the first two equalizing networks have been connected, but not the third. The relay W0 symbolizes the possibility of disconnecting all equalizing networks upon for example the disconnection of the connection. The embodiment with relays is shown only in order to elucidate the arrangement in a simple manner and the control may of course be carried out by means of electronic means. FIG. 10 shows diagrammatically an example of the propagation time distortion for a measuring object without any equalizing network and after connection of 1, 2, respectively 3 equalizing networks. FIG. 11 shows the signal distortion corresponding to the value in milliamperes, obtained on the output of the distortion measuring means without equalization of the distortion and after the connection of one, two respectively three equalizing networks. As it appears after connection of the third equalizing network the value has come below that threshold which constitutes the limit of possibility of transmitting data through the line.

We claim:

1. In a pulse data transmission system which includes a data transmitter for transmitting test pulses prior to data pulses, said pulses being transmitted at a given rate, a data receiver for receiving the test pulses and data pulses, a transmission line connecting the data transmitter to the data receiver and apparatus in said data receiver controlled by the test pulses for automatically minimizing the attenuation and phase distortion of pulses introduced by the transmission line, said apparatus comprising: a network of controlled equalizers, said network having a pulse-receiving input means for receiving pulses from the transmission line, a pulse-transmission output means and a control input means; means connected to said pulse-transmission output means for periodically sampling the amplitudes of received test pulses at a rate which is related to said given rate and for generating control signals when said amplitudes are different from a given amplitude; and means receiving said control signals for actively connecting different ones of said controlled equalizers between said pulse-receiving input means and said pulse-transmitting output means of said network.

2. The system of claim 1 wherein the means for periodically sampling the amplitudes of received test pulses includes pulse generator means for generating a pulse during each sampling time when the amplitude of the received test pulse is different from said given amplitude, and further comprising a pulse counter means having an input terminal receiving the pulses generated by said pulse generator means and output terminals connected to said control input means of said network of controlled equalizers for actively connecting different ones of said controlled equalizers between said pulse receiving means and said pulse-transmitting means in accordance with the number of pulses received by said pulse counter means.

3. The system of claim 2 wherein all of said controlled equalizers are connected in one serial path between said pulse-receiving input means and said pulse-transmitting output means and including means for selectively short circuiting each of said controlled equalizers.

4. The system of claim 3 wherein each of said short-circuiting means is connected to one of the output terminals of said pulse counter means.

5. The system of claim 4 wherein said pulse counter means is a ring counter.

6. In a data receiver which receives signal elements from a data transmission channel, a circuit arrangement for the equalization of distortion in the data transmission channel, said circuit arrangement comprising in combination: a plurality of propagation time distortion correcting networks for connection to the data transmission channel; distortion detecting means for measuring changes in amplitude of a number of signal elements spaced over a time interval and for forming an average value of said amplitude changes, said average value being a measure of the distortion of a signal received from the data transmission channel; and switching means actuable by said average value for connecting in turn said correcting networks to the data transmission channel in accordance with the deviation of said average value from a predetermined value until said average value is reduced to said predetermined value.

References Cited

UNITED STATES PATENTS

| | | | |
|---|---|---|---|
| 1,847,151 | 3/1932 | Watson et al. | 178—69 |
| 2,036,059 | 3/1936 | Lang | 178—69 |
| 2,303,054 | 11/1942 | Lang | 178—69 |
| 2,341,996 | 2/1944 | Lang | 178—69 |

FOREIGN PATENTS

| | | |
|---|---|---|
| 475,474 | 11/1937 | Great Britain. |
| 844,228 | 8/1960 | Great Britain. |

NEIL C. REID, *Primary Examiner.*

THOMAS A. ROBINSON, *Examiner.*